May 15, 1956   I. V. ZOZULIN   2,745,351
MOTOR DRIVEN PUMPS
Filed Sept. 2, 1952
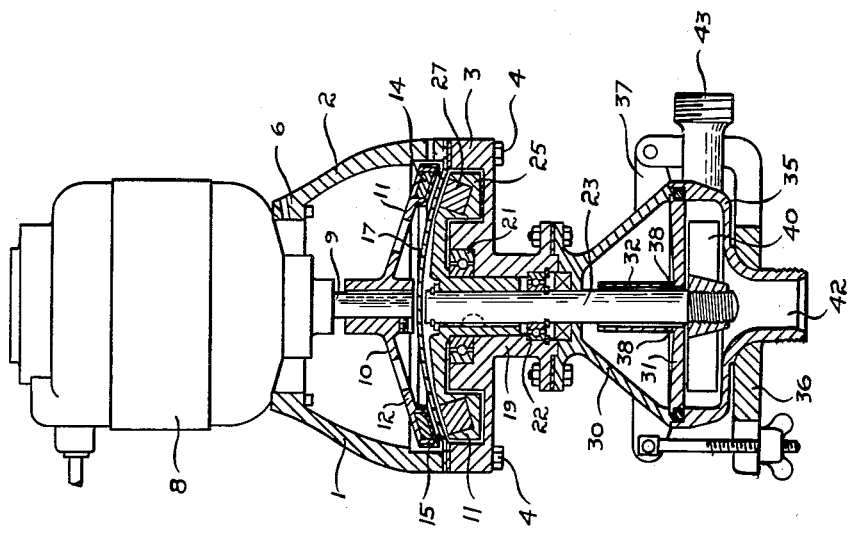
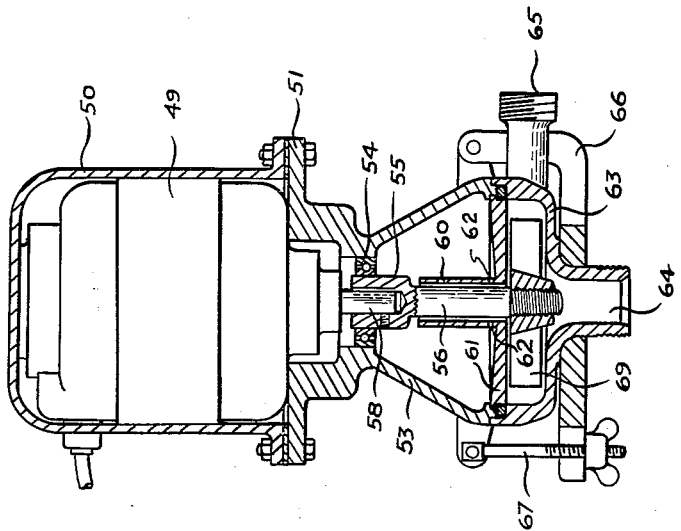
INVENTOR
IGOR V. ZOZULIN
ATTORNEY United States Patent Office 2,745,351
Patented May 15, 1956

2,745,351

MOTOR DRIVEN PUMPS

Igor V. Zozulin, Vancouver, British Columbia, Canada, assignor to Hermag Pumps Ltd., Vancouver, British Columbia, Canada Application September 2, 1952, Serial No. 307,437

3 Claims. (Cl. 103—103)

My invention relates to improvements in motor driven pumps which are particularly adapted for pumping or agitating lactic fluids in dairies, or for processing other liquids used in the preparation of foods or beverages.

In pumps of this nature it is highly desirable that the liquid pumped or otherwise agitated shall not find its way into any bearing or crevice in the machine where bacteria or fungus may lodge or develop. It is also necessary that any part of the assembly which may come into contact with the liquid pumped can be thoroughly cleansed and rendered absolutely sanitary at the end of each run.

In pumps and agitators where the drive between the motor and the pump is by a magnetic clutch having drive and driven rotors separated by a diaphragm, it is important that the bearing of the driven rotor should be rigid so that there can be close tolerances between said rotor and the diaphragm for efficient working of the clutch and that the fluid pumped be kept below or out of contact with said bearing.

The objects of the invention are therefore to provide a structure whereby the above desideratum may be obtained.

Referring to the accompanying drawings:

Figure 1 is a vertical sectional view of the invention showing the pump driven through a magnetic clutch.

Figure 2 is a vertical sectional view of the invention showing the motor hermetically sealed.

In the drawings like characters of reference indicate corresponding parts in each figure.

The numeral 1 indicates generally a housing consisting of an inverted cup-shaped body 2 and a base member 3 which is adapted to be connected thereto by bolts or studs 4.

Mounted upon the upper rim 6 of the housing 1 is a motor 8 having a vertical drive shaft 9 which is fitted with a drive rotor 10 of a magnetic clutch 11. The drive rotor is a disk 12 having an annular ring 14 of a material of high magnetic permeability which is covered on its working face 15 with copper or other material of high electrical conductivity, which material preferably extends to cover at least part of the inner and outer peripheral surfaces of the ring.

The body 2 is fitted with a dome shaped diaphragm 17 of substantially non-magnetic material. The base member 3 is provided with a depending central boss 19, in which boss bearings 21 and 22 are mounted to journal a driven shaft 23 having a driven rotor 25 keyed thereto. The rotor 25 is provided with an annular ring of magnets 27 which cause said rotor to rotate simultaneously with the drive rotor 10. Secured to the base of the boss 19 is a conical bell 30 through which the driven shaft 23 extends. A plate 31 forms a closure for the bottom edge of the bell and is provided with a sleeve 32 which loosely fits the shaft 23. The sleeve and plate 31 are preferably held in place under the cone by a pump casing 35 which in turn is hingedly carried by a clamp member 36 from lugs 37 attached to the bell 30. Apertures 38 are formed at the base of the sleeve 32 to allow any liquid which may have entered said sleeve or the bell 30 to be drawn into the vortex developed in the pump casing during its normal operation. An impeller 40 is fitted by a screw to the base end of the shaft 23 in such a manner that the pump may be dismantled without tools as often as it is called for. The pump casing 35 is provided with usual inlet and outlet indicated by the numerals 42 and 43 respectively.

In the modification shown in Figure 2, the motor 49 is entirely enclosed in a housing 50 and rests upon a flanged bottom closure 51 bolted thereto. The closure has formed therewith a cone shaped bell 53 similar to the bell 30 hereinbefore referred to. A bearing 54 is provided in the top of the bell 53 in which a socket 55 of a driven shaft 56 is journalled. The motor shaft 58 extends into the socket 55 and is non-rotatably connected thereto. The lower part of the driven shaft 56 is fitted with a freely removable sleeve 60 which is integral with a plate 61 fitting the bell to form a removable closure therefor. Apertures 62 are formed at the base of the sleeve 60 to drain off any liquid from within the bell 53 when the pump is in operation. The plate 61 forms one side plate or head for a scroll type pump casing 63 having a suction inlet 64 and an outlet 65. The pump casing 63 is preferably mounted upon a clamp member 66 detachably anchored to the bell 53 by a bolt 67. The plate 61 is demountable and an agitator 69 is screwed into the lower end of the driven shaft 56 so as to be readily removed for cleaning.

In use, the bell 30 and all the spaces around and about the shaft 23 and the rotor 25 below the diaphram 17 form a cavity which is open only to the pump casing 35 through the sleeve 32 surrounding the shaft 23. The volumetric capacity of the bell is such that when the maximum head pressure of the liquid being pumped is attained, the air normally entrapped in the cavity will prevent liquid entering the conical bell or reaching beyond the top of the sleeve 32 and the sleeve will prevent a tangential splash of liquid onto the walls of the bell 30 Where the sleeve is not provided agitation takes place due to the rotating shaft which drives out air from the bell and allows liquid to enter. The sleeve not only stops the discharge of entrapped air from the bell but also prevents any splash taking place which might cause liquid to reach bearings and other parts above the bell. The base member 3 and its integral boss 19 provide a long rigid bearing for the driven rotor, its shaft and the pump assembly and permits the shaft to be entirely free from the diaphram, so that no mechanical strains are developed to distort said diaphram as is the case in other magnetic clutch assemblies, consequently the two rotors may be spaced more closely to the diaphragm and each other, so as to avoid wear between them.

In the modification shown in Figure 2, the motor shaft 56 is journalled at the top of the bell 53 and the bell capacity is such that the static pressure on the liquid will prevent liquid from approaching the bearing and the fitting of a stationary sleeve 60 to the lower part of the driven shaft will definitely prevent the shaft from causing any liquid splash, which may reach said bearing.

What I claim as my invention is:

1. A power driven pump having a vertical shaft fitted with a clutch element at its upper end and an agitator at its lower end, a pump casing enclosing the agitator, a bell surrounding the lower part of the shaft and a base member enclosing the upper part of the shaft and the clutch element, said base member having a top closure, said shaft having bearings carried by the base member, a plate covering the pump casing and a sleeve carried by said plate and freely surrounding the shaft, said sleeve having a weeping aperture adjacent the plate, said bell being of such volumetric capacity that when the pump is being operated at maximum pressure air normally entrapped in the bell and the base member and compressed to said pressure will prevent liquid pumped from reaching the shaft bearings.

2. A power driven pump as claimed in claim 1, in which the bell is characterized as being conical.

3. A power driven pump as claimed in claim 1, in which the bell is characterized as being conical with its base of substantially the diameter of the pump casing.

References Cited in the file of this patent

UNITED STATES PATENTS

| | | |
|---|---|---|
| 2,047,330 | Petersen | July 14, 1936 |
| 2,237,027 | Dorer | Apr. 1, 1941 |
| 2,381,824 | La Bour | Aug. 7, 1945 |
| 2,481,172 | Staggs | Sept. 6, 1949 |
| 2,541,906 | Anderson | Feb. 13, 1951 |
| 2,603,160 | La Bour | July 15, 1952 |
| 2,638,558 | Rankin | May 12, 1953 |

FOREIGN PATENTS

| | | |
|---|---|---|
| 192,618 | Great Britain | Feb. 8, 1923 |
| 440,751 | Italy | Oct. 18, 1948 |
| 873,660 | France | July 16, 1942 |